(12) United States Patent
Matsumura et al.

(10) Patent No.: US 12,214,667 B2
(45) Date of Patent: Feb. 4, 2025

(54) POWER TRANSMISSION MECHANISM AND LIQUID EJECTING DEVICE

(71) Applicant: SEIKO EPSON CORPORATION, Tokyo (JP)

(72) Inventors: Shuhei Matsumura, Shiojiri (JP); Tetsuya Miyagawa, Shiojiri (JP); Soshi Okawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/414,041

(22) Filed: Jan. 16, 2024

(65) Prior Publication Data

US 2024/0239176 A1 Jul. 18, 2024

(30) Foreign Application Priority Data

Jan. 18, 2023 (JP) ................................. 2023-005675

(51) Int. Cl.
| | |
|---|---|
| *F16H 57/12* | (2006.01) |
| *B60K 6/36* | (2007.10) |
| *B65H 79/00* | (2006.01) |
| *F16H 1/20* | (2006.01) |

(52) U.S. Cl.
CPC .............. *B60K 6/36* (2013.01); *B65H 79/00* (2013.01); *F16H 1/20* (2013.01); *F16H 57/12* (2013.01); *B65H 2403/10* (2013.01); *B65H 2403/40* (2013.01)

(58) Field of Classification Search
CPC B65H 79/00; B65H 2403/10; B65H 2403/40; F16H 1/20; F16H 57/12
See application file for complete search history.

(56) References Cited

U.S. PATENT DOCUMENTS

| | | | |
|---|---|---|---|
| 2011/0280627 A1* | 11/2011 | Matsuda ............ | G03G 15/5008 |
| | | | 399/167 |
| 2019/0225440 A1 | 7/2019 | Kakuda | |
| 2022/0119213 A1* | 4/2022 | Kii ........................ | B65H 29/125 |

FOREIGN PATENT DOCUMENTS

| | | | | |
|---|---|---|---|---|
| EP | 0374958 A2 * | 6/1990 | ............. | F16N 29/02 |
| JP | 0981057 A * | 3/1997 | ............. | G09F 11/29 |
| JP | 2019-127395 A | 8/2019 | | |

* cited by examiner

*Primary Examiner* — Tisha D Lewis

(74) *Attorney, Agent, or Firm* — WORKMAN NYDEGGER

(57) ABSTRACT

A power transmission mechanism including an operation unit, a drive source, and a gear train mechanism including a plurality of power transmission gears of which rotation centers are arranged in a staggered pattern as viewed from the axial direction. The gear train mechanism includes a first gear located most downstream in the power transmission direction, a second gear that engages with the first gear, and a dummy gear that does not have a function of transmitting power. The dummy gear engages with the first gear and has a rotation center arranged in a staggered pattern with respect to the first gear and the second gear as viewed from the axial direction.

6 Claims, 5 Drawing Sheets

POWER TRANSMISSION MECHANISM AND LIQUID EJECTING DEVICE

The present application is based on, and claims priority from JP Application Serial Number 2023-005675, filed Jan. 18, 2023, the disclosure of which is hereby incorporated by reference herein in its entirety.

BACKGROUND

1. Technical Field

The present disclosure relates to a power transmission mechanism and a liquid ejecting device.

2. Related Art

Power transmission mechanisms have been used in various apparatuses such as liquid ejecting devices typified by inkjet printers. Among them, there is a power transmission mechanism including a gear train mechanism including a plurality of power transmission gears. For example, JP-A-2019-127395 discloses a power transmission mechanism constituted by gears forming a gear train.

However, in a power transmission mechanism including a gear train mechanism including a plurality of power transmission gears, tooth skipping may occur at an engagement portion between the gears of the gear train because the teeth of one gear are out of mesh with the teeth of the other gear. Such tooth skipping is likely to occur when the gears forming the gear train are arranged linearly as viewed from the axial direction. This is because as the gear rotates, a force is applied to the gear to cause the gear to be misaligned. Here, JP-A-2019-127395 discloses a configuration in which the gears forming the gear train are arranged in a curved line rather than a straight line when viewed from the axial direction. Depending on the rotating direction of the gears, it is possible to reduce the possibility of misalignment of the gear sandwiched between the gears forming the gear train and to make tooth skipping less likely to occur. However, the gear located most downstream in the power transmission direction may be misaligned in any case, and hence tooth skipping is likely to occur.

SUMMARY

In order to solve the above problem, a power transmission mechanism according to the present disclosure includes an operation unit, a drive source configured to generate power for operating the operation unit, and a gear train mechanism including a plurality of power transmission gears of which rotation centers are arranged in a staggered pattern when viewed from an axial direction and configured to transmit the power by rotating the plurality of power transmission gears. The gear train mechanism includes a first gear as the power transmission gear located most downstream in a power transmission direction in which the power is transmitted from the drive source to the operation unit, a second gear as the power transmission gear engaged with the first gear and transmitting the power to the first gear, and a dummy gear not having a function of transmitting the power. The dummy gear is engaged with the first gear and has a rotation center arranged in a staggered pattern with respect to the first gear and the second gear as viewed from the axial direction.

DESCRIPTION OF EMBODIMENTS

Figure 1:
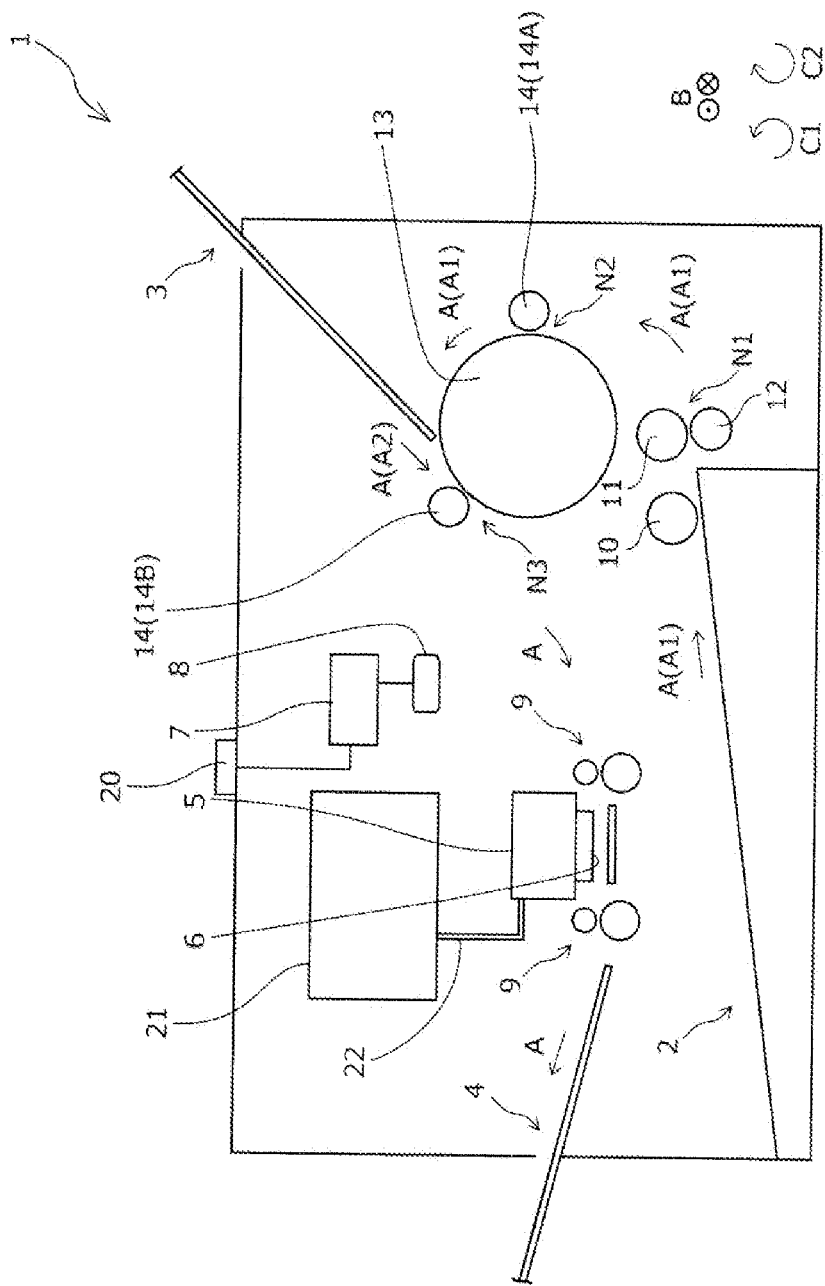
FIG. 1 is a schematic diagram illustrating the internal configuration of a printer according to an embodiment of the present disclosure.

Hereinafter, the present disclosure will be schematically described.

A power transmission mechanism according to a first aspect of the present disclosure includes an operation unit, a drive source configured to generate power for operating the operation unit, and a gear train mechanism including a plurality of power transmission gears of which rotation centers are arranged in a staggered pattern when viewed from an axial direction and configured to transmit the power by rotating the plurality of power transmission gears. The gear train mechanism includes a first gear as the power transmission gear located most downstream in a power transmission direction in which the power is transmitted from the drive source to the operation unit, a second gear as the power transmission gear engaged with the first gear and transmitting the power to the first gear, and a dummy gear not having a function of transmitting the power. The dummy gear is engaged with the first gear and has a rotation center arranged in a staggered pattern with respect to the first gear and the second gear as viewed from the axial direction.

According to the present aspect, a dummy gear that does not have a function of transmitting power is provided, the dummy gear engages with the first gear, and the rotation center of the dummy gear is disposed in a staggered pattern with respect to the first gear and the second gear when viewed from the axial direction. That is, the power transmission mechanism is provided with the dummy gear capable of suppressing the misalignment of the first gear even when a force is applied to the first gear located most downstream in the power transmission direction with the rotation of the power transmission gear. Therefore, it is possible to suppress tooth skipping of each power transmission gear including the power transmission gear located most downstream in the gear train mechanism including the plurality of power transmission gears.

A power transmission mechanism according to a second aspect of the present disclosure is an aspect dependent on the first aspect, in which the operation unit is a conveyance unit that conveys a medium.

According to the present aspect, the operation unit is the conveyance unit that conveys a medium. Therefore, the conveyance accuracy of media in the conveyance unit can be improved.

A power transmission mechanism according to a third aspect of the present disclosure is an aspect dependent on the first or second aspect, in which the diameter of the dummy gear is smaller than the diameter of the first gear.

According to the present aspect, the diameter of the dummy gear is smaller than the diameter of the first gear. Therefore, since the dummy gear can be made small, the power transmission mechanism can be downsized.

A power transmission mechanism according to a fourth aspect of the present disclosure is an aspect dependent on the first or second aspect, in which the diameter of the dummy gear is larger than the diameter of the first gear.

According to the present aspect, the diameter of the dummy gear is larger than the diameter of the first gear. Since the rotation speed of the dummy gear can be reduced by driving the large dummy gear, the power transmission mechanism can be reduced in noise.

A power transmission mechanism according to a fifth aspect of the present disclosure is an aspect dependent on any one of the first to fourth aspects, in which a rotating shaft of the dummy gear is configured to have a first shaft width that is a shaft width in a first direction toward a rotation center of the first gear is wider than a second shaft width that is a shaft width in a second direction orthogonal to the first direction.

According to the present aspect, a rotating shaft of the dummy gear is configured to have a first shaft width that is a shaft width in a first direction toward a rotation center of the first gear is wider than a second shaft width that is a shaft width in a second direction orthogonal to the first direction. Therefore, the dummy gear can particularly effectively suppress the misalignment of the first gear and can particularly effectively suppress tooth skipping of the first gear.

A liquid ejecting device according to a sixth aspect of the present disclosure includes a power transmission mechanism according to any one of the first to fifth aspects and a liquid ejecting unit configured to eject liquid to a medium.

According to the present aspect, in addition to the power transmission mechanism, a liquid ejecting unit that ejects liquid to the medium is provided. Therefore, in the liquid ejecting device including the liquid ejecting unit that ejects liquid onto the medium, the operation accuracy in the operation unit can be improved.

Hereinafter, the present disclosure will be specifically described. First, an outline of an inkjet printer 1 that is a liquid ejecting device including a power transmission mechanism 100 according to the present disclosure will be described. Hereinafter, the inkjet printer 1 is simply referred to as the printer 1. Hereinafter, the direction in which a medium is fed and the direction in which power generated by a drive source is transmitted may be referred to as "downstream", and the opposite direction may be referred to as "upstream".

As shown in FIG. 1, the printer 1 includes an accommodation unit 2 that accommodates media. A plurality of media can be loaded in the accommodation unit 2. Note that the printer 1 according to the present embodiment can be additionally provided with a medium accommodation unit capable of accommodating media below the accommodation unit 2. However, the printer is not limited to such a configuration.

The printer 1 is provided with a pickup roller 10 that feeds a medium accommodated in the accommodation unit 2 in a conveying direction A. A separation roller 11 is provided downstream of the pickup roller 10 in the medium conveyance path. The medium is conveyed in the conveying direction A toward the separation roller 11 by the pickup roller 10 and then conveyed in the conveying direction A by the pickup roller 10 and the separation roller 11.

Here, as illustrated in FIG. 1 and the like, a retard roller 12 is provided at a position facing the separation roller 11. As described above, in the printer 1 according to the present embodiment, a plurality of media can be stacked in the accommodation unit 2. When the first medium which is the uppermost medium stacked in the accommodation unit 2 is conveyed, the leading end of the second medium is made to abut on the retard roller 12 so that the second medium conveyed following the first medium is not doubly fed. The first medium that has reached a nip point N1 between the separation roller 11 and the retard roller 12 is conveyed in the conveying direction A by the pickup roller 10 and the separation roller 11, but the leading end of the second medium is made to abut on the retard roller 12, so that the second medium is stopped without being conveyed and separated from the first medium.

The pickup roller 10 and the separation roller 11 rotate in the first rotating direction C1 when conveying the medium. The pickup roller 10 and the separation roller 11 are connected to the motor 8 electrically connected to the control unit 7 including a CPU, a storage unit, and the like via a plurality of gears and the like and are driven by the driving force of the motor 8. The pickup roller 10 and the separation roller 11, which are operation units, and the motor 8, which is a drive source, each are one of the constituent members that constitute the power transmission mechanism 100 described later. As illustrated in FIG. 1, the printer 1 according to the present embodiment includes a reception unit 20 that receives an execution command of a recording operation from a user, that is, a conveyance instruction of the medium M.

As illustrated in FIG. 1 and the like, the printer 1 includes an intermediate roller 13 and two driven rollers 14 provided at positions facing the intermediate roller 13 in the conveyance path of the medium. The intermediate roller 13 is also an operation unit similarly to the pickup roller 10 and the separation roller 11 and is connected to the motor 8 via a plurality of gears and the like. The leading end of the medium conveyed in the conveying direction A by the pickup roller 10 and the separation roller 11 reaches a nip point N2 between the intermediate roller 13 and a first driven roller 14A of the driven rollers 14.

After the leading end of the medium reaches the nip point N2, the medium is conveyed in the conveying direction A by the intermediate roller 13 and the first driven roller 14A. Further, the leading end of the medium conveyed in the conveying direction A by the intermediate roller 13 and the first driven roller 14A reaches a nip point N3 between the intermediate roller 13 and a second driven roller 14B of the driven rollers 14. After the leading end reaches the nip point N3, the medium is conveyed in the conveying direction A by the intermediate roller 13 and the two driven rollers 14. The intermediate roller 13 rotates in the first rotating direction C1 when conveying the medium. On the other hand, both the first driven roller 14A and the second driven roller 14B rotate in a second rotating direction C2 when conveying the medium.

As illustrated in FIG. 1 and the like, the printer 1 is provided with an insertion portion 3 into which a medium can be manually inserted by a user. The medium inserted into the insertion portion 3 is conveyed in the conveying direction A at the nip point N3 between the intermediate roller 13 and the second driven roller 14B. Specifically, as illustrated in FIG. 1, the medium accommodated in the accommodation unit 2 is conveyed in a conveying direction A1 of the conveying directions A to the nip point N3, and the medium inserted into the insertion portion 3 is conveyed in a conveying direction A2 of the conveying directions A to the nip point N3.

The medium whose leading end reaches the nip point N3 is conveyed by the intermediate roller 13 toward a position facing a line head 6 provided in a head unit 5 that is provided downstream of the nip point N3 in the conveying direction A. A conveyance roller pair 9 is provided upstream and downstream of the head unit 5 in the conveying direction A. The conveyance roller pair 9 includes a driving roller driven by the motor 8 and a driven roller that is driven to rotate in contact with the driving roller. That is, the driving roller of the conveyance roller pair 9 can also be regarded as an operation unit as one of the components constituting the power transmission mechanism 100.

The line head 6 is connected to an ink cartridge 21 containing ink via a tube 22. That is, the line head 6 is a liquid ejecting unit having a configuration capable of ejecting ink sent from the ink cartridge 21 through the tube 22 toward the medium, in other words, a recording unit.

The medium receiving a feeding force from the conveyance roller pair 9 is sent to a recording position facing the line head 6. The line head 6 constitutes the head unit 5. The line head 6 ejects ink, which is an example of liquid, onto the image forming surface of the medium to execute recording. The line head 6 is an ink ejection head configured such that nozzles that eject ink cover the entire region in a width direction B and is configured as an ink ejection head capable of performing recording in the entire region of the medium in the width direction B without moving in the width direction B. However, the ink ejection head is not limited thereto and may be of a type that is mounted on a carriage and ejects ink while moving in the width direction B. In addition, it is also possible to use a recording unit having a configuration other than that of the ink ejection head, such as a thermal transfer recording unit.

The medium on which recording has been performed by the line head 6 is conveyed by the conveyance roller pair 9 and is discharged to a discharge tray 4. There is no particular limitation on the configuration of the accommodation unit 2 that accommodates media, the insertion portion 3 into which a medium is inserted, and the discharge tray 4 on which discharged media can be stacked. The accommodation unit 2 and the discharge tray 4 may be configured to be capable of stacking a plurality of media.

As described above, the printer 1 according to the present embodiment includes the power transmission mechanism 100, which will be described in detail below, and the line head 6, which is a liquid ejecting unit that ejects ink, which is liquid, onto a medium. Due to such a configuration, in the printer 1 including the liquid ejecting unit that ejects liquid onto a medium, it is possible to improve the operation accuracy in the operation unit. Hereinafter, the power transmission mechanism 100, which is a main part of the printer 1 according to the present embodiment, will be described in detail with reference to FIGS. 2 to 5.

Figure 2:
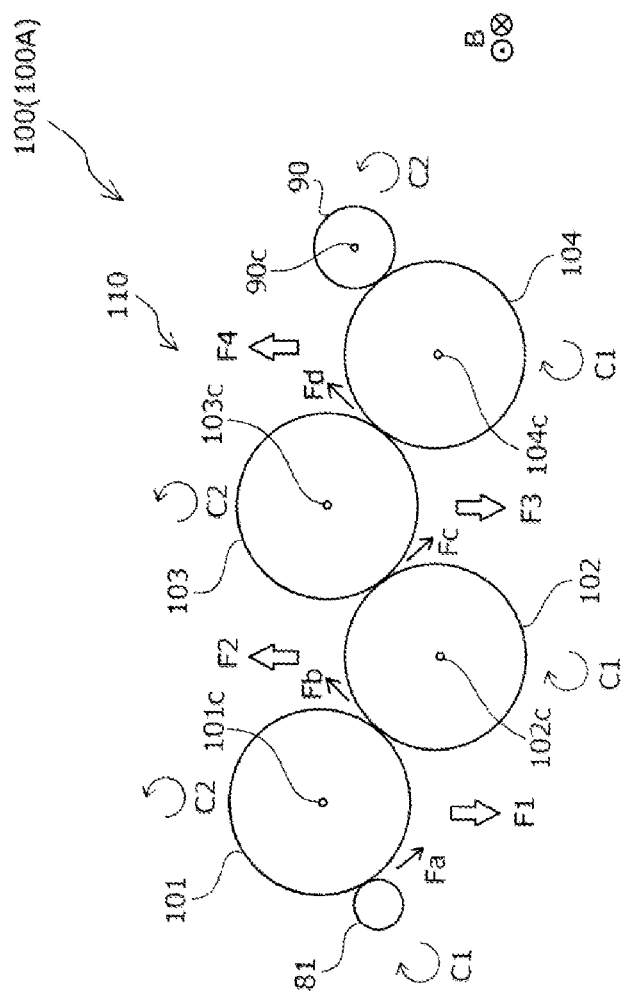
FIG. 2 is a schematic view illustrating a gear train mechanism of the printer in FIG. 1.

As described above, a power transmission mechanism 100A according to the present embodiment as the power transmission mechanism 100 includes a pickup roller 10, a separation roller 11, an intermediate roller 13, and the like as the operation units, and a motor 8 as the drive source that generates power for operating these operation units. Furthermore, as illustrated in FIG. 2, the power transmission mechanism includes the gear train mechanism 110 that includes a plurality of power transmission gears 101, 102, 103, and 104 in which rotation centers $101c$, $102c$, $103c$, and $104c$ are arranged in a staggered pattern when viewed from the width direction B corresponding to the axial direction and transmits power generated by the motor 8 by rotating the plurality of power transmission gears 101, 102, 103, and 104. The rotation centers $101c$, $102c$, $103c$, and $104c$ are arranged in a staggered pattern means that they are not arranged on a straight line but arranged alternately. In this specification, the power transmission mechanism 100 includes the operation unit and the drive source but may not include the operation unit and the drive source.

Here, a gear 81 is a gear attached to the rotating shaft of the motor 8. By driving the motor 8 to rotate the rotating shaft of the motor 8 and the gear 81 in the first rotating direction C1, the power transmission gear 101 engaged with the gear 81 rotates in the second rotating direction C2. When the power transmission gear 101 rotates in the second rotating direction C2, the power transmission gear 102 engaged with the power transmission gear 101 rotates in the first rotating direction C1. When the power transmission gear 102 rotates in the first rotating direction C1, the power transmission gear 103 engaged with the power transmission gear 102 rotates in the second rotating direction C2. When the power transmission gear 103 rotates in the second rotating direction C2, the power transmission gear 104 engaged with the power transmission gear 103 rotates in the first rotating direction C1. Here, the power transmission gear 104 is a power transmission gear located most downstream of the gear train mechanism 110 of the power transmission mechanism 100A according to the present embodiment, and power from the motor 8 is transmitted to the pickup roller 10, the separation roller 11, the intermediate roller 13, and the like via the power transmission gear 104.

In other words, the gear train mechanism 110 of the power transmission mechanism 100A according to the present embodiment includes the power transmission gear 104 that is the first gear as the power transmission gear located most downstream in a power transmission direction in which power is transmitted from the motor 8, which is a drive source, to an operation unit and the power transmission gear 103 that is the second gear as a power transmission gear engaged with the power transmission gear 104 and transmitting power generated by the motor 8 to the power transmission gear 104. Furthermore, as illustrated in FIG. 2, the gear train mechanism 110 of the power transmission mechanism 100A according to the present embodiment includes a dummy gear 90 having no function of transmitting power generated by the motor 8. The dummy gear 90 is engaged with the power transmission gear 104, and a rotation center $90c$ is arranged in a staggered pattern as viewed from the width direction B with respect to the power transmission gear 104 and the power transmission gear 103.

That is, the power transmission mechanism 100A according to the present embodiment includes the dummy gear 90 capable of suppressing the misalignment of the power transmission gear 104 even when a force is applied to the power transmission gear 104 located most downstream in the power transmission direction as the power transmission gears 101, 102, 103, and 104 rotate. Therefore, the power transmission mechanism 100A according to the present embodiment can suppress the tooth skipping of the power transmission gears 101, 102, 103, and 104 including the power transmission gear 104 which is the gear located most downstream in the power transmission direction in the gear train mechanism 110 including the plurality of power transmission gears. In the present embodiment, the four power transmission gears 101, 102, 103, and 104 are used, but the number of power transmission gears constituting the gear train mechanism 110 is not particularly limited.

Here, in the power transmission mechanism 100A according to the present embodiment, the operation unit is the conveyance roller that conveys media. Specifically, the pickup roller 10, the separation roller 11, the intermediate roller 13, and the like are provided. Therefore, in the power transmission mechanism 100A according to the present embodiment, it is possible to improve the conveyance accuracy of media in the conveyance unit. However, the operation unit is not limited to the conveyance unit. The operation unit may be a constituent member that performs an operation different from the conveyance of media.

Figure 3:
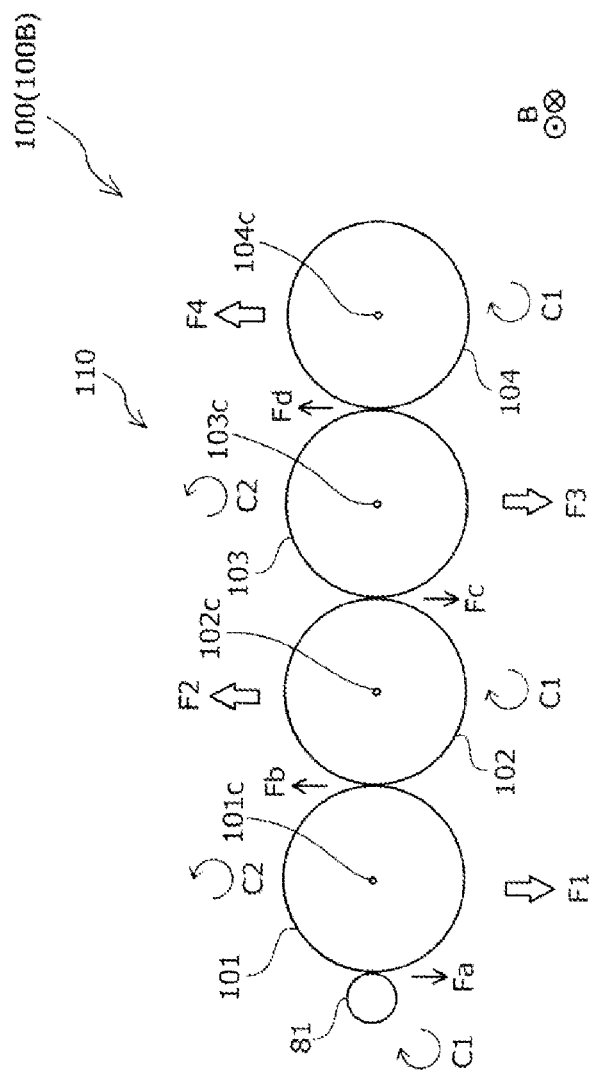
FIG. 3 is a schematic view illustrating the gear train mechanism of a printer according to a reference example including a plurality of power transmission gears in which rotation centers are not arranged in a staggered pattern when viewed from the axial direction.
Figure 4:
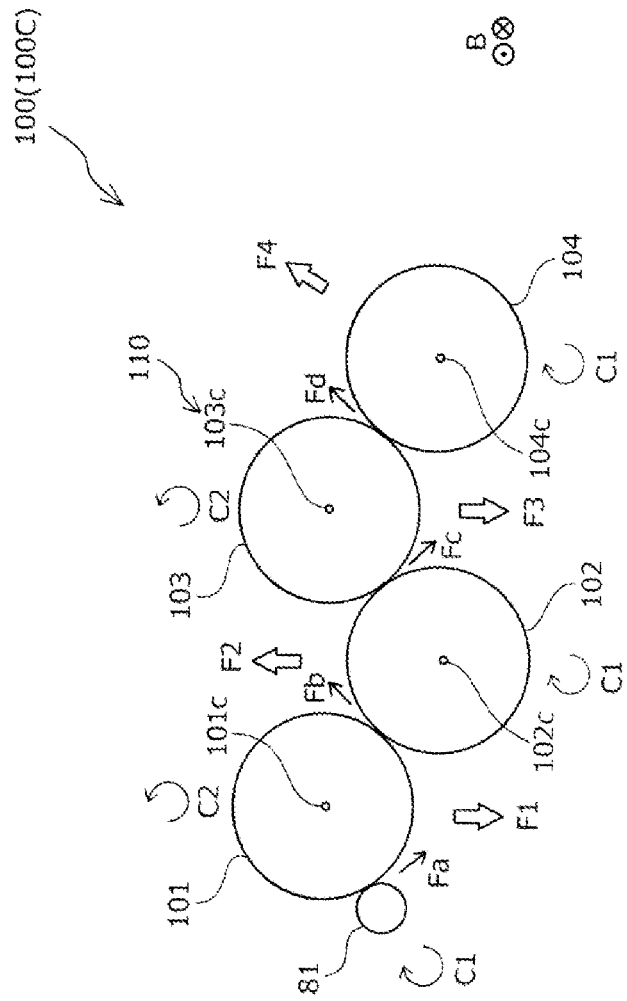
FIG. 4 is a schematic view illustrating the gear train mechanism of a printer according to a reference example different from FIG. 3 including a plurality of power transmission gears not having a dummy gear but having rotation centers arranged in a staggered pattern when viewed from the axial direction.

Hereinafter, the reason why the power transmission mechanism 100A according to the present embodiment can suppress tooth skipping of the power transmission gear 104, which is the gear located most downstream in the power transmission direction, will be described in comparison with a power transmission mechanism 100B in FIG. 3 and a power transmission mechanism 100C in FIG. 4 used in the printer according to the reference example. First, the reason why tooth skipping of the power transmission gears occurs in the power transmission mechanism 100B in FIG. 3 will be described. In FIGS. 3 and 4, the same components as those in FIG. 2 are denoted by the same reference numerals.

As illustrated in FIG. 3, the power transmission mechanism 100B includes a plurality of power transmission gears 101, 102, 103, and 104 having rotation centers 101c, 102c, 103c, and 104c arranged in a straight line when viewed from the width direction B. When the plurality of power transmission gears are provided in such an arrangement, a power transmission gear 101 rotates in the second rotating direction C2 by rotating a gear 81 in the first rotating direction C1. At this time, the power transmission gear 101 receives a force in the direction Fa corresponding to the downward direction in the drawing from the gear 81. Therefore, the power transmission gear 101 is likely to be misaligned in the same direction F1 as the direction Fa. When the power transmission gear 101 is misaligned, tooth skipping is likely to occur between the gear 81 and the power transmission gear 101 and between the power transmission gear 101 and the power transmission gear 102. Furthermore, when the power transmission gear 101 rotates the power transmission gear 102, a reaction force from the power transmission gear 102 is received in the same direction as the direction Fa, so that tooth skipping is more likely to occur.

When the power transmission gear 101 rotates in the second rotating direction C2, the power transmission gear 102 rotates in the first rotating direction C1. At this time, the power transmission gear 102 receives a force in a direction Fb corresponding to an upward direction in the drawing from the power transmission gear 101, and the power transmission gear 102 is likely to be misaligned in the same direction F2 as the direction Fb. Similarly, the power transmission gear 103 is likely to be misaligned in the same direction F3 as the direction Fc by receiving a force in the direction Fc corresponding to the downward direction in the drawing from the power transmission gear 102, and the power transmission gear 104 is likely to be misaligned in the same direction F4 as a direction Fd by receiving a force in the direction Fd corresponding to the upward direction in the drawing from the power transmission gear 103. Further, similarly to the power transmission gear 101, the power transmission gear 102 and the power transmission gear 103 receive reaction forces from the rotating gears and thus are more likely to be misaligned. Here, the power transmission mechanism 100B has the gear 81 and the power transmission gears 101, 102, 103, and 104 arranged in a straight line and hence is not configured to prevent one gear from being misaligned with respect to adjacent gears, and in other words, is not configured to make adjacent gears receive a force applied to one gear. That is, the power transmission mechanism 100B is not configured to suppress tooth skipping.

Next, the reason why the tooth skipping of power transmission gears occurs in the power transmission mechanism 100C in FIG. 4 will be described. As illustrated in FIG. 4, the power transmission mechanism 100C includes a plurality of power transmission gears 101, 102, 103, and 104 having rotation centers 101c, 102c, 103c, and 104c arranged in a staggered pattern when viewed from the width direction B. When the plurality of power transmission gears are provided in such an arrangement, a power transmission gear 101 rotates in the second rotating direction C2 by rotating a gear 81 in the first rotating direction C1. At this time, the power transmission gear 101 receives a force in the direction Fa in the drawing from the gear 81. However, the power transmission gear 102 is disposed on the direction Fa side with respect to the power transmission gear 101. For this reason, it is assumed that the force applied to the power transmission gear 101 in the direction Fa is received by the power transmission gear 102, the force acts on the power transmission gear 101 in the direction F1 corresponding to the downward direction in the drawing, and misalignment easily occurs in the direction F1. However, actually, since the gap between the gear 81 and the power transmission gear 102 is smaller than the outer diameter of the power transmission gear 101, the power transmission gear 101 is less likely to be misaligned.

When the power transmission gear 101 rotates in the second rotating direction C2, the power transmission gear 102 rotates in the first rotating direction C1. At this time, the power transmission gear 102 receives a force in the direction Fb from the power transmission gear 101. However, the power transmission gear 103 is disposed on the direction Fb side with respect to the power transmission gear 102. For this reason, it is assumed that the force applied to the power transmission gear 102 in the direction Fb is received by the power transmission gear 103, the force acts on the power transmission gear 102 in the direction F2 corresponding to the upward direction in the drawing, and misalignment easily occurs in the direction F2. However, actually, since the gap between the power transmission gear 101 and the power transmission gear 103 is smaller than the outer diameter of the power transmission gear 102, the power transmission gear 102 is less likely to be misaligned.

Similarly, when the power transmission gear 102 rotates in the first rotating direction C1, the power transmission gear 103 rotates in the second rotating direction C2. At this time, the power transmission gear 103 receives a force in the direction Fc from the power transmission gear 102. However, the power transmission gear 104 is disposed on the direction Fc side with respect to the power transmission gear 103. For this reason, it is assumed that the force applied to the power transmission gear 103 in the direction Fc is received by the power transmission gear 104, the force acts on the power transmission gear 103 in the direction F1 corresponding to the downward direction in the drawing, and misalignment easily occurs in the direction F3. However, actually, since the gap between the power transmission gear 102 and the power transmission gear 104 is smaller than the outer diameter of the power transmission gear 103, the power transmission gear 103 is less likely to be misaligned.

When the power transmission gear 103 rotates in the second rotating direction C2, the power transmission gear 104 rotates in the first rotating direction C1. At this time, the power transmission gear 104 receives a force in a direction Fd from the power transmission gear 103. However, no particular constituent member is disposed on the direction Fd side with respect to the power transmission gear 104. Therefore, a force acts on the power transmission gear 104 in the direction F4 corresponding to the same direction as the direction Fd, and misalignment easily occurs in the direction F4. As described above, in the power transmission mechanism 100C in FIG. 4, the power transmission gears 101, 102, and 103 are less likely to be misaligned and less likely to cause tooth skipping, but the power transmission gear 104 is likely to be misaligned and cause tooth skipping.

Therefore, as illustrated in FIG. 2, the power transmission mechanism 100A according to the present embodiment includes the dummy gear 90 downstream of the power transmission gear 104 in the power transmission direction with respect to the power transmission mechanism 100C illustrated in FIG. 4. That is, the power transmission gear 104 rotates in the first rotating direction C1 with the rotation of the power transmission gear 103 in the second rotating direction C2, and the power transmission gear 104 receives the force in the direction Fd from the power transmission gear 103, but the dummy gear 90 is disposed on the direction Fd side with respect to the power transmission gear 104. Therefore, in the power transmission mechanism 100A according to the present embodiment, it is assumed that the force applied to the power transmission gear 104 in the direction Fd is received by the dummy gear 90, the force acts on the power transmission gear 104 in the direction F4 corresponding to the upward direction in the drawing, and misalignment easily occurs in the direction F4. However, actually, since the gap between the power transmission gear 103 and the dummy gear 90 is smaller than the outer diameter of the power transmission gear 104, the power transmission gear 104 is less likely to cause misalignment. Therefore, in the power transmission mechanism 100 A according to the present embodiment, the power transmission gears 101, 102, and 103 are less likely to be misaligned and cause tooth skipping, and the power transmission gear 104 is also less likely to be misaligned and cause tooth skipping.

Here, as illustrated in FIG. 2, in the power transmission mechanism 100A according to the present embodiment, the diameter (outer diameter) of the dummy gear 90 is smaller than the diameter (outer diameter) of the power transmission gear 104 which is the first gear adjacent to the dummy gear 90. With such a configuration, the dummy gear 90 can be reduced in size, and the power transmission mechanism 100 can be downsized.

However, the present disclosure is not limited to such a configuration. The diameter of the dummy gear 90 in the power transmission mechanism 100 may be larger than the diameter of the first gear adjacent to the dummy gear 90. Since the rotation speed of the dummy gear 90 can be reduced by driving the large dummy gear 90, the power transmission mechanism 100 can be reduced in noise by making the diameter of the dummy gear 90 larger than the diameter of the first gear adjacent to the dummy gear 90.

Figure 5:
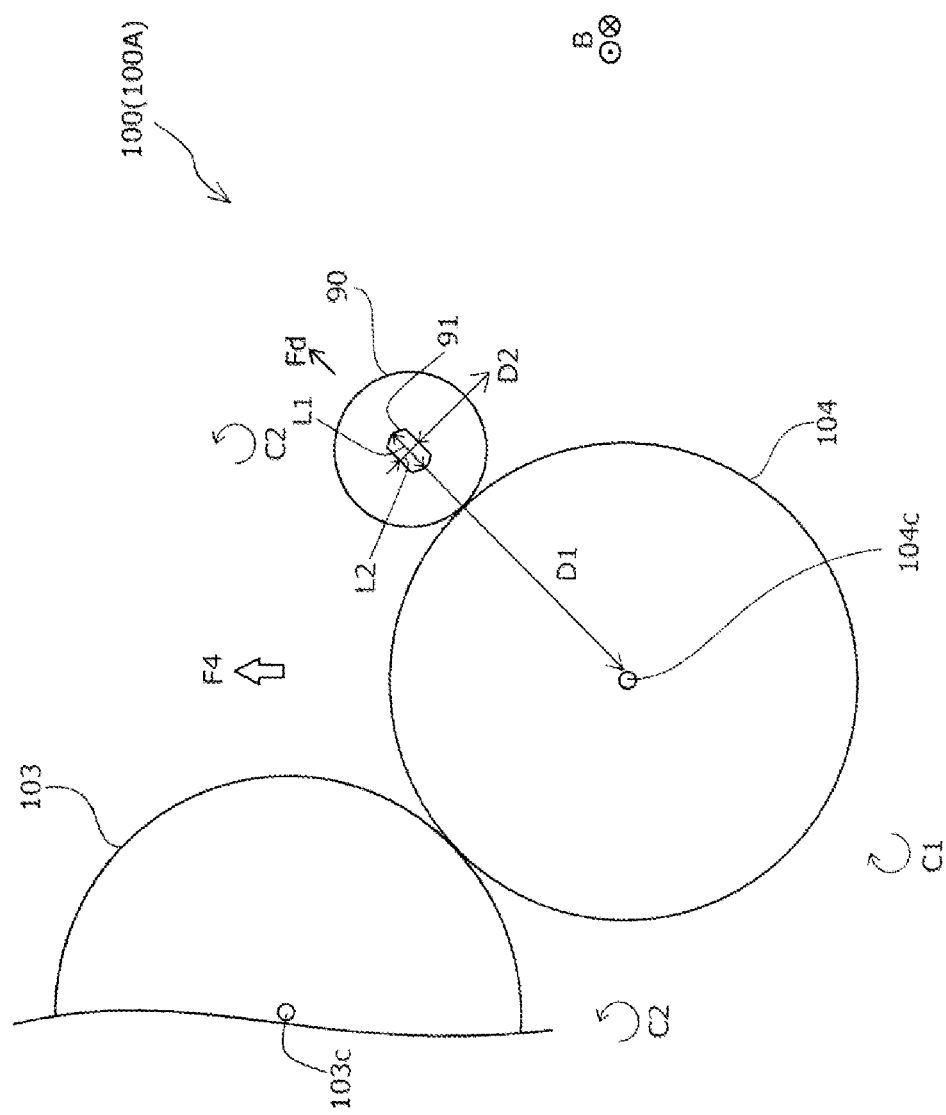
FIG. 5 is a schematic view illustrating the surroundings of the rotating shaft of a dummy gear of the gear train mechanism in FIG. 2.

Here, as illustrated in FIG. 5, in the power transmission mechanism 100A according to the present embodiment, a rotating shaft 91 of the dummy gear 90 does not rotate following the rotation of the dummy gear 90 but is fixed, and a first shaft width L1, which is the shaft width in a first direction D1 toward the rotation center 104c of the power transmission gear 104 as the first gear, is configured to be wider than a second shaft width L2, which is the shaft width in a second direction D2 orthogonal to the first direction D1. Note that the rotating shaft 91 corresponds to the rotation center 90c in FIG. 2, and the first direction D1 corresponds to the direction Fd in FIG. 2. With such a configuration, the rotating shaft 91 can effectively receive the force applied from the power transmission gear 104, and the dummy gear 90 can particularly effectively suppress the misalignment of the power transmission gear 104. Therefore, it is possible to particularly effectively suppress tooth skipping of the power transmission gear 104.

The present disclosure is not limited to each embodiment described above, many variations are possible within the scope of the present disclosure as described in the appended claims, and it goes without saying that such variations also fall within the scope of the present disclosure. For example, the operation unit may be a liquid feeding mechanism such as a tube pump that feeds ink from the ink cartridge 21 to the line head 6, and the power transmission mechanism according to the present disclosure may be applied to the power transmission mechanism. In addition, the discharge tray 4 may be configured to be movable in the vertical direction according to the number of stacked media discharged and the like, the operation unit may be a moving mechanism, and the power transmission mechanism according to the present disclosure may be applied to the power transmission mechanism. Furthermore, for example, the present disclosure is not limited to the printer and may be applied to a scanner, an intermediate unit provided between various devices, a conveyance device in a finisher, or the like.

What is claimed is:

1. A power transmission mechanism comprising:
   an operation unit;
   a drive source configured to generate power for operating the operation unit; and
   a gear train mechanism including a plurality of power transmission gears of which rotation centers are arranged in a staggered pattern when viewed from an axial direction and configured to transmit the power by rotating the plurality of power transmission gears, wherein
   the gear train mechanism includes a first gear as the power transmission gear located most downstream in a power transmission direction in which the power is transmitted from the drive source to the operation unit, a second gear as the power transmission gear engaged with the first gear and transmitting the power to the first gear, and a dummy gear not having a function of transmitting the power, and
   the dummy gear is engaged with the first gear and has a rotation center arranged in a staggered pattern with respect to the first gear and the second gear as viewed from the axial direction.

2. The power transmission mechanism according to claim 1, wherein the operation unit is a conveyance unit configured to convey a medium.

3. The power transmission mechanism according to claim 1, wherein a diameter of the dummy gear is smaller than a diameter of the first gear.

4. The power transmission mechanism according to claim 1, wherein a diameter of the dummy gear is larger than a diameter of the first gear.

5. The power transmission mechanism according to claim 1, wherein a rotating shaft of the dummy gear is configured to have a first shaft width that is a shaft width in a first direction toward a rotation center of the first gear is wider than a second shaft width that is a shaft width in a second direction orthogonal to the first direction.

6. A liquid ejecting device comprising:
a power transmission mechanism according to claim 1; and
a liquid ejecting unit configured to eject liquid to a medium.

* * * * *